US010244738B1

(12) United States Patent
Ruiz

(10) Patent No.: US 10,244,738 B1
(45) Date of Patent: Apr. 2, 2019

(54) TEMPERATURE CONTROLLING AQUARIUM CLEANING DEVICE

(71) Applicant: Bernard Ruiz, Brooklyn, NY (US)

(72) Inventor: Bernard Ruiz, Brooklyn, NY (US)

(73) Assignee: Bernard Ruiz, Ridgewood, NY (US)

( * ) Notice: Subject to any disclaimer, the term of this patent is extended or adjusted under 35 U.S.C. 154(b) by 359 days.

(21) Appl. No.: 15/336,683

(22) Filed: Oct. 27, 2016

Related U.S. Application Data

(60) Provisional application No. 62/333,680, filed on May 9, 2016.

(51) Int. Cl.
*A01K 63/04* (2006.01)
*A01K 63/00* (2017.01)

(52) U.S. Cl.
CPC ............ *A01K 63/04* (2013.01); *A01K 63/006* (2013.01)

(58) Field of Classification Search
CPC .............................. A01K 63/04; A01K 63/006
USPC ....................................................... 119/264
See application file for complete search history.

(56) References Cited

U.S. PATENT DOCUMENTS

| | | | | |
|---|---|---|---|---|
| 3,303,819 A * | 2/1967 | Wade | ...................... | A01K 63/04 119/264 |
| 3,785,342 A * | 1/1974 | Rogers | ................. | A01K 63/045 119/259 |
| 4,610,784 A * | 9/1986 | Reyniers | ................ | A01K 63/04 119/259 |
| 5,006,264 A * | 4/1991 | Acuna | ..................... | B01D 35/00 137/140 |
| 5,097,795 A * | 3/1992 | Adey | ....................... | A01K 63/04 119/226 |
| 5,422,014 A * | 6/1995 | Allen | ....................... | C02F 1/008 210/139 |
| 5,484,525 A * | 1/1996 | Mowka, Jr. | ............ | A01K 63/04 119/263 |
| 5,695,654 A * | 12/1997 | Schultz | ................ | A01K 63/006 119/264 |
| 5,779,884 A * | 7/1998 | Raymo | ................. | A01K 63/006 119/264 |
| 6,058,884 A * | 5/2000 | Rawls | ................... | A01K 63/006 119/232 |
| 6,158,386 A * | 12/2000 | Limcaco | ................ | A01K 63/04 119/245 |
| 6,517,320 B1 * | 2/2003 | Reynolds | .................. | F04F 5/10 210/167.12 |
| 6,808,625 B1 * | 10/2004 | Wu | ......................... | A01K 63/04 119/263 |
| 6,878,267 B1 * | 4/2005 | Mandia | .................. | A01K 63/04 119/259 |
| 7,214,314 B2 * | 5/2007 | Reyniers | .............. | A01K 63/045 15/1.7 |

(Continued)

FOREIGN PATENT DOCUMENTS

GB 2110103 A * 6/1983 ............. A01K 63/04

*Primary Examiner* — Magdalena Topolski
*Assistant Examiner* — Morgan T Barlow

(57) ABSTRACT

An apparatus having a temperature gauge that can attach to a faucet for replenishing an aquarium with clean water. In this manner a user may monitor the temperature of the water while adding the water to an aquarium or another container. The apparatus includes a LED screen temperature gauge, a screw on faucet connection, and a hose connection outlet. The apparatus may also add or remove water from one source to another.

17 Claims, 3 Drawing Sheets

(56) References Cited

U.S. PATENT DOCUMENTS

| | | | | |
|---|---|---|---|---|
| 8,157,925 B1* | 4/2012 | Templin | B08B 9/08 | |
| | | | 134/166 R | |
| 8,347,820 B2* | 1/2013 | Sigmon | A01K 63/04 | |
| | | | 119/259 | |
| 8,733,385 B2* | 5/2014 | Ogawa | F04F 10/00 | |
| | | | 119/232 | |
| 9,221,668 B1* | 12/2015 | Reyniers | A01K 63/006 | |
| 9,717,220 B2* | 8/2017 | Sawicki | A01K 63/045 | |
| 2002/0088176 A1* | 7/2002 | Gergek | A01G 27/003 | |
| | | | 47/79 | |
| 2003/0213078 A1* | 11/2003 | Kristofek | B08B 1/04 | |
| | | | 15/97.1 | |
| 2007/0068858 A1* | 3/2007 | Davison | A01K 63/045 | |
| | | | 210/167.23 | |
| 2007/0193956 A1* | 8/2007 | Nelson | A01K 63/04 | |
| | | | 210/703 | |
| 2010/0058992 A1* | 3/2010 | Miyake | A01K 63/003 | |
| | | | 119/252 | |
| 2010/0065414 A1* | 3/2010 | Rautenbach | B01D 1/0017 | |
| | | | 202/167 | |
| 2011/0162585 A1* | 7/2011 | Tominaga | A01K 63/045 | |
| | | | 119/259 | |
| 2011/0293968 A1* | 12/2011 | Leung | A01K 85/01 | |
| | | | 429/7 | |
| 2012/0325755 A1* | 12/2012 | Turover | B08B 9/08 | |
| | | | 210/767 | |
| 2014/0041594 A1* | 2/2014 | Plante | A01K 63/003 | |
| | | | 119/227 | |
| 2014/0096718 A1* | 4/2014 | Allen | A01K 63/047 | |
| | | | 119/259 | |
| 2016/0081311 A1* | 3/2016 | Simeoli | A01K 63/04 | |
| | | | 119/264 | |
| 2016/0220971 A1* | 8/2016 | Volker | B01F 3/088 | |
| 2017/0105393 A1* | 4/2017 | Plante | A01K 63/006 | |
| 2018/0020645 A1* | 1/2018 | Beranguer | B24C 3/06 | |
| | | | 119/264 | |
| 2018/0022618 A1* | 1/2018 | Bertrand | C02F 9/00 | |
| | | | 210/103 | |
| 2018/0050927 A1* | 2/2018 | Penrose | A01K 63/04 | |

* cited by examiner

TEMPERATURE CONTROLLING AQUARIUM CLEANING DEVICE

CROSS-REFERENCE TO RELATED APPLICATION

The present application is related to and claims priority from prior provisional application Ser. No. 62/333,680, filed May 9, 2016 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of aquarium maintenance systems and more specifically relates to a temperature controlling aquarium cleaning device.

2. Description of the Related Art

Aquariums retain fish, water, plants, and other dwellings within a container with at least one transparent side. Many invertebrates, amphibians, aquatic reptiles, and plants have a necessary range of temperature that they can survive in. Aquariums are notoriously tedious to maintain due to the buildup of bacteria, algae, and other organisms. Fish and aquatic animals often perish due to lack of maintenance of aquarium owners. Thus a means to provide accurate temperature and replenishment of clean water to an aquarium in a user friendly manner is needed.

Various attempts have been made to solve the above-mentioned problems such as those found in U.S. Publication No. 2012/0325755 to David Turover, et al; U.S. Pat. No. 4,921,614 to Jay P. Frickman, et al; and U.S. Pat. No. 9,021,988 to David Turover, et al. This prior art is representative of aquarium cleaning and filtering devices. None of the above inventions and patents, taken either singly or in combination, is seen to describe the invention as claimed.

Ideally, a temperature controlling aquarium cleaning device should provide temperature monitored clean water to an aquarium with a thermometer attached to a faucet, so a user may view the current temperature of water being added into an aquarium and, yet would operate reliably and be manufactured at a modest expense. Thus, a need exists for a reliable temperature controlling aquarium cleaning device to avoid the above-mentioned problems.

BRIEF SUMMARY OF THE INVENTION

In view of the foregoing disadvantages inherent in the known aquarium maintenance system art, the present invention provides a novel temperature controlling aquarium cleaning device. The general purpose of the present invention, which will be described subsequently in greater detail is to provide a user the ability to control the temperature of water being routed into an aquarium.

A temperature controlling aquarium cleaning device for use in removing dirty water from an aquarium and adding fresh water to an aquarium at a temperature monitored by a user is disclosed herein, in a preferred embodiment, comprising: a water diverter member adapted to allow a flow of fresh water from a water source to an aquarium and remove dirty water from an aquarium, a siphoning member, and a temperature gauge adapted to detect the temperature of fresh water from a water source.

The water diverter member, formed from tubular plastic having a thickness of approximately one eighth inch, includes a diverter body having a diverter first end adapted to be connected to a water source via a coupling member formed as female threading, a diverter second end adapted to allow a flow of dirty water from the water diverter member into a sink, and a diverter connector adapted to connect to a hose first end via a coupling member formed as female threading.

The water diverter member further includes a diverter second end cap adapted to be removably attached to the diverter second end to restrict fresh water from exiting the water diverter member via the diverter second end when fresh water is being added to the aquarium. The diverter second end cap is formed from plastic having a rounded shape with a sidewall measuring approximately one half inch which snaps onto the diverter second end via inserting the diverter second end into the sidewall. The diverter second end cap is held in place on the diverter second end via friction generated by the sidewall and the diverter second end. Thus, the diverter second end cap is adapted to be attached to the diverter second end during an operation of adding fresh water to an aquarium and adapted to be removed from the diverter second end during an operation of removing dirty water from an aquarium.

The siphoning member is formed from plastic having a tubular shape and includes a siphoning first end, a siphoning body, and a siphoning second end. The diverter connector is indirectly connected to the siphoning first end via a hose with the siphoning first end being formed as male threading.

Dirty water is removed from an aquarium via being siphoned through the siphoning second end, through the siphoning body, through the siphoning first end, through a hose, through the diverter connector and flowing out the diverter second end when the diverter second end cap is not attached to the diverter second end. Fresh water is added to an aquarium via a water source, as fresh water passes through an upper portion of the diverter body, passes through a hose, and passes through the siphoning member when the diverter second end cap is attached to the diverter second end. Siphoning force is created using gravity.

The temperature gauge includes a sensor fixedly attached to a back surface thereof via an adhesive and adapted to sense a temperature of fresh water entering the diverter body, a display member adapted to display a temperature of fresh water in degrees Fahrenheit, and a power source adapted to provide energy to the display member formed from clear plastic having a rectangular shape.

The back surface of the temperature gauge having attached sensor is fixedly attached to an upper portion of the diverter body via an adhesive.

The power source is located within a power compartment located within a hollow volume of the display member and is adapted to contain the power source. The power source is formed as a mercuric oxide battery generating approximately one point thirty-five volts of energy and is adapted to provide energy to the display member. The mercuric oxide battery is formed in a shape of a circular disk.

The power compartment includes a power source tray adapted to hold the power source and is adapted to open and close vertically relative to the display member and the power compartment via a pullout tab.

The present invention holds significant improvements and serves as a temperature controlling aquarium cleaning device. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, temperature controlling aquarium cleaning device constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to an aquarium maintenance device and more particularly to a temperature controlling aquarium cleaning device as used to improve the ability for a user to control the temperature of water being routed into an aquarium.

Generally speaking, the temperature controlling aquarium cleaning device is designed to help a user monitor the temperature of water being added to an aquarium during the process of cleaning the aquarium. The device includes the capabilities of removing dirty water via a siphon and adding fresh water using a temperature gauge that provides a display of the temperature of the fresh water.

Figure 1:
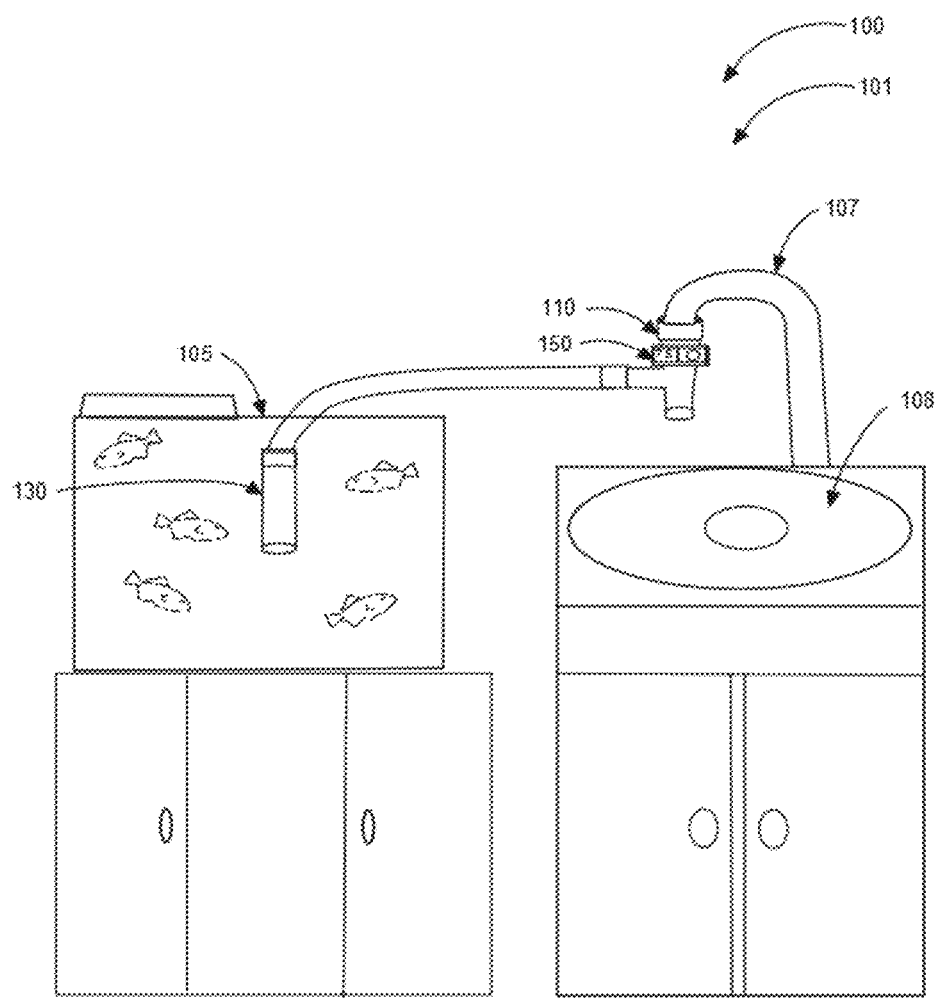
FIG. 1 shows a perspective view illustrating a temperature controlling aquarium cleaning device according to an embodiment of the present invention.

Referring to the drawings by numerals of reference there is shown in FIG. 1, a perspective view illustrating temperature controlling aquarium cleaning device 100 in an in use condition 101 according to an embodiment of the present invention.

Temperature controlling aquarium cleaning device 100 for use in removing dirty water from aquarium 105 and adding fresh water to aquarium 105 at a temperature monitored by a user is disclosed herein, in a preferred embodiment, comprising water diverter member 110 adapted to allow a flow of fresh water from water source 107 to aquarium 105 and remove dirty water from aquarium 105, siphoning member 130, and temperature gauge 150 adapted to detect temperature of fresh water from water source 107.

Figure 2:
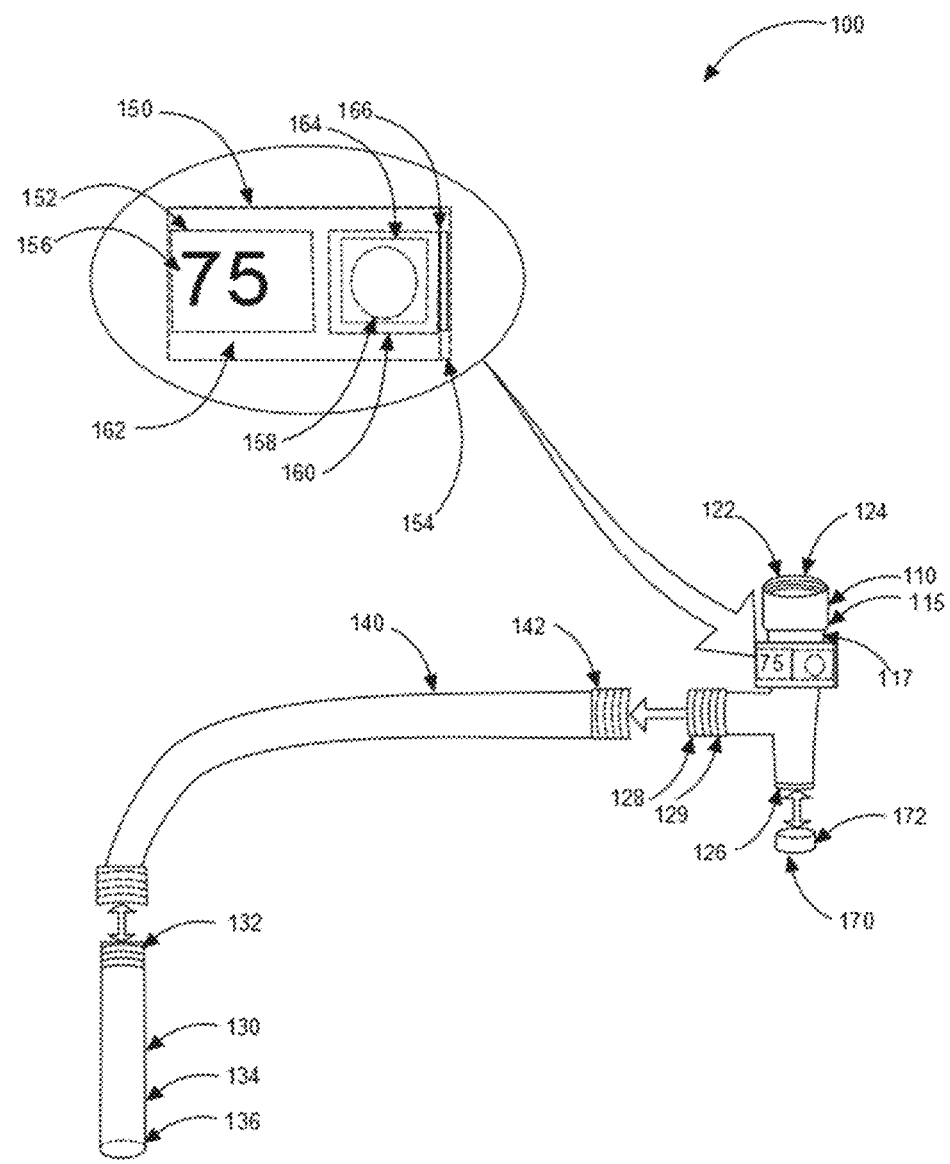
FIG. 2 is a perspective view illustrating a temperature controlling aquarium cleaning device according to an embodiment of the present invention of FIG. 1.

Referring now to FIG. 2, perspective view illustrating temperature controlling aquarium cleaning device 100 according to an embodiment of the present invention of FIG. 1.

Water diverter member 110, formed from tubular plastic having a thickness of approximately one eighth inch, includes diverter body 115 having diverter first end 122 adapted to be connected to water source 107 via coupling member 124 formed as female threading, diverter second end 126 adapted to allow a flow of dirty water from water diverter member 110 into sink 108, and diverter connector 128 adapted to connect to hose first end 142 via coupling member 129 on diverter connector 128 formed as female threading. Water diverter member 110 may alternately be formed from any suitable material and may vary in thickness.

Water diverter member 110 further includes diverter second end cap 170 adapted to be removably attached to diverter second end 126 to restrict fresh water from exiting water diverter member 110 via diverter second end 126 when fresh water is being added to aquarium 105. Diverter second end cap 170 is formed from plastic having a rounded shape with sidewall 172 measuring approximately one half inch which snaps onto diverter second end 126 via inserting diverter second end 126 into sidewall 172. Diverter second end cap 170 is held in place on the diverter second end via friction generated by the sidewall and the diverter second end. Thus, diverter second end cap 170 is adapted to be attached to diverter second end 126 during an operation of adding fresh water to aquarium 105 and adapted to be removed from diverter second end 126 during an operation of removing dirty water from aquarium 105. Diverter second end cap 170 may alternately be formed from any suitable material and would use any suitable mode of connecting diverter second end cap 170 to diverter second end 126.

Siphoning member 130 is formed from plastic having a tubular shape and includes siphoning first end 132, siphoning body 134, and siphoning second end 136. Diverter connector 128 is indirectly connected to siphoning first end 132 via hose 140 with siphoning first end 132 being formed as male threading. Siphoning member 130 may alternately be formed from any suitable material.

Dirty water is removed from aquarium 105 via being siphoned through siphoning second end 136, through siphoning body 134, through siphoning first end 132, through hose 140, through diverter connector 128 and flowing out diverter second end 126 when diverter second end cap 170 is not attached to diverter second end 126. Fresh water is added to aquarium 105 via water source 107, as fresh water passes through upper portion 117 of diverter body 115, passes through hose 140, and passes through siphoning member 130 when diverter second end cap 170 is attached to diverter second end 170. Siphoning force is created using gravity. Hose 140 may be formed as a garden hose, a tube formed of a suitable material, or any other device useful for transporting fresh water and dirty water to and from aquarium 105.

Temperature gauge 150 includes sensor 152 affixed to the back surface 154 via an adhesive and adapted to sense a temperature of fresh water passing through the diverter body 115 Display member 156 adapted to display a temperature of fresh water in degrees Fahrenheit (alternately, in degrees Celsius). Power source 158 adapted to provide energy to display member 156, the display member formed from clear plastic having a rectangular shape.

Power source 158 is located within power compartment 160 located within hollow volume 162 of display member 156 and is adapted to contain power source 158. Power source 158 is formed as a mercuric oxide battery generating approximately one point thirty-five volts of energy and is adapted to provide energy to display member 156. The mercuric oxide battery is formed in a shape of a circular disk. Power source 158 may alternately be formed as any battery suitable for providing energy to display member 156.

Power compartment 160 includes power source tray 164 adapted to hold power source 158 and is adapted to open and close vertically relative to display member 156 and power compartment 160 via pullout tab 166.

Figure 3:
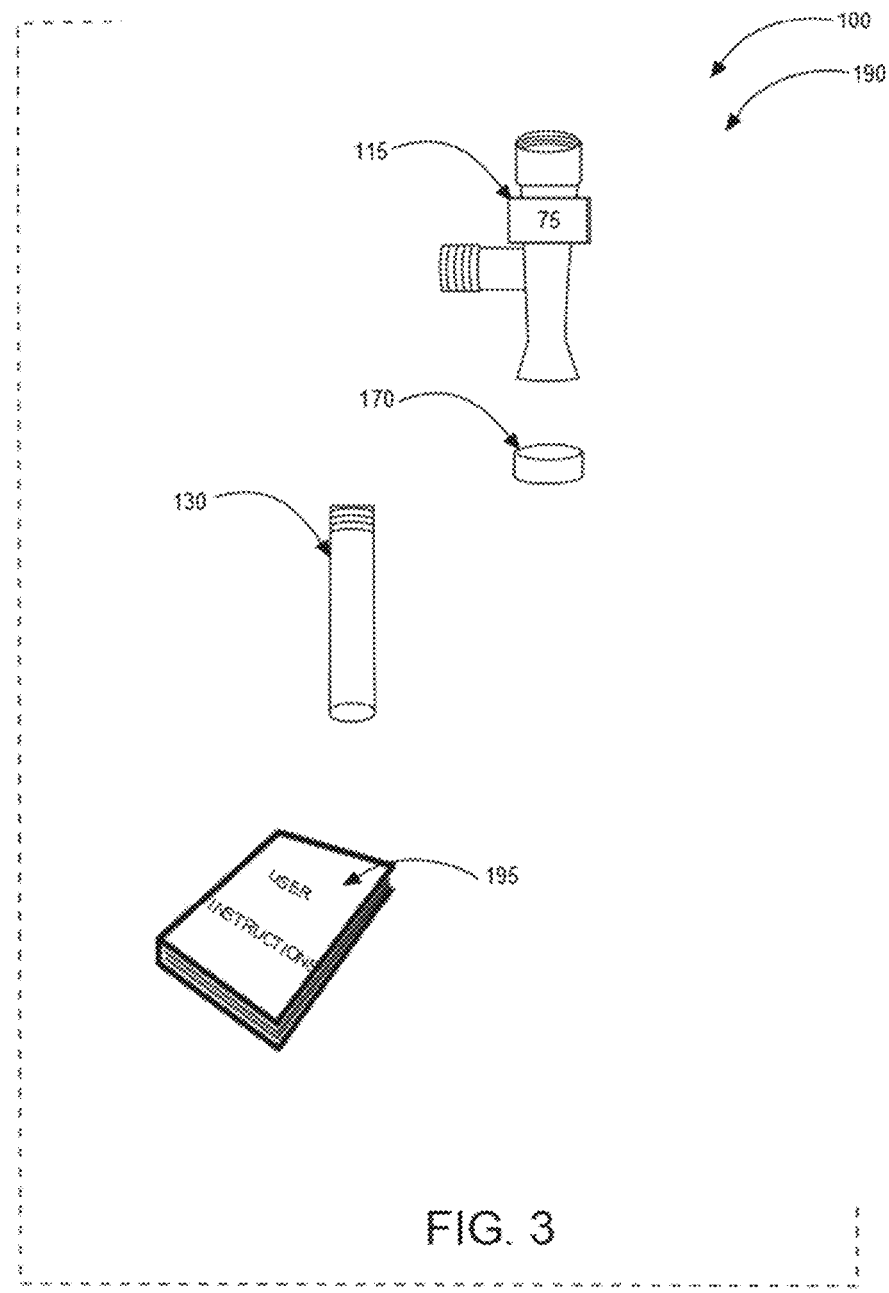
FIG. 3 showing a temperature controlling aquarium cleaning device as a kit.

Referring now to FIG. 3, showing temperature controlling aquarium cleaning device 100 as a kit.

Temperature controlling aquarium cleaning device 100 may be sold as kit 190 comprising the following parts: at least one diverter body 115 at least one siphoning member 130; at least one temperature gauge 150; at least one diverter second end cap 170; and at least one set of user instructions 195. Kit has instructions such that functional relationships are detailed in relation to the structure of the invention (such that the invention can be used, maintained, or the like in a preferred manner). Temperature controlling aquarium cleaning device 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A temperature controlling aquarium cleaning device comprising:
    (1) a diverter body comprising:
        (a) a diverter first end configured to removably couple to the water source,
        (b) a diverter second end configured to allow a flow of dirty water through said water diverter member into a sink, and
        (c) diverter connector configured to removably couple with a first end of a hose;
    (2) a siphoning member comprising:
        (a) a siphoning body with
            (i) a first end configured to removably couple with a second end of the hose, and
            (ii) a second end opposite the first end of the siphoning member,
            wherein the siphoning member is configured to allow the flow of water therethrough; and
    (3) an end cap is configured to be moveable between a filling position and a removing position at the water diverter second end, the filling position blocking flow of fresh water through the water diverter second end into the sink, thereby allowing the flow of fresh water into the aquarium, and the removing position allowing dirty water to flow from the aquarium through the water diverter second end into the sink;
    wherein dirty water is removed from the aquarium by siphoning the dirty water through said siphoning second end, the dirty water then passes through the siphoning member, the hose, the diverter member, and exits said water diverter member second end into the sink, with the end cap in the removing position;
    wherein fresh water is added to the aquarium by turning on the water source, as a result, the fresh water passes through said diverter body, the hose, and through said siphoning member into the aquarium, with the end cap in the filling position;
    and
    (4) a temperature gauge comprising:
        (1) a sensor attached to a back surface of the gauge, the sensor configured to contact and sense a temperature of the fresh water entering said diverter body;
        (2) a display member configured to display the measured temperature of the fresh water; and
        (3) a power source configured to provide energy to said display member;
    wherein said temperature gauge is fixedly attached to said diverter body.

2. The temperature controlling aquarium cleaning device of claim 1, wherein said water diverter member comprises tubular plastic with a thickness of approximately 3 mm.

3. The temperature controlling aquarium cleaning device of claim 1, wherein said diverter first end is removably coupled via female threading.

4. The temperature controlling aquarium cleaning device of claim 1, wherein said power source is contained within a hollow volume of said display member, said hollow volume comprises a power source tray holding said power source, and configured to open and close relative to the display member.

5. The temperature controlling aquarium cleaning device of claim 1, wherein said diverter connector is removably coupled via female threading.

6. The temperature controlling aquarium cleaning device of claim 1, wherein said siphoning first end is removably coupled via male threading.

7. The temperature controlling aquarium cleaning device of claim 1, wherein the end cap at the second end of the water diverter comprises plastic having a rounded shape and a sidewall measuring approximately 13 mm.

8. The temperature controlling aquarium cleaning device of claim 7, wherein the end cap at the second end of the water diverter snaps into said diverter second end by inserting said diverter second end into said sidewall.

9. The temperature controlling aquarium cleaning device of claim 8, wherein the end cap at the second end of the water diverter is held in place on said diverter second end via friction generated between said sidewall and said diverter second end.

10. The temperature controlling aquarium cleaning device of claim 1, wherein said power source is a mercuric oxide battery.

11. The temperature controlling aquarium cleaning device of claim 1, wherein said display member is configured to display in degrees Celsius.

12. The temperature controlling aquarium cleaning device of claim 1, wherein said display member comprises clear plastic having a rectangular shape.

13. The temperature controlling aquarium cleaning device of claim 1, wherein said display member is configured to display degrees Fahrenheit.

14. The temperature controlling aquarium cleaning device of claim 10, wherein said mercuric oxide battery generates 1.35 volts of energy.

15. The temperature controlling aquarium cleaning device of claim 10, wherein said mercuric oxide battery a circular disk.

16. The temperature controlling aquarium cleaning device of claim 1, wherein said siphoning member comprises a plastic tube.

17. A kit for the temperature controlling aquarium cleaning device of claim 1 comprising:
   the diverter body;
   the diverter second end cap;
   the siphoning member; and
   the temperature gauge.

* * * * *